C. R. RANEY AND R. B. HITCHCOCK.
ADJUSTABLE STRAW CONVEYER.
APPLICATION FILED JAN. 27, 1919.
1,426,908.
Patented Aug. 22, 1922.
2 SHEETS—SHEET 1.
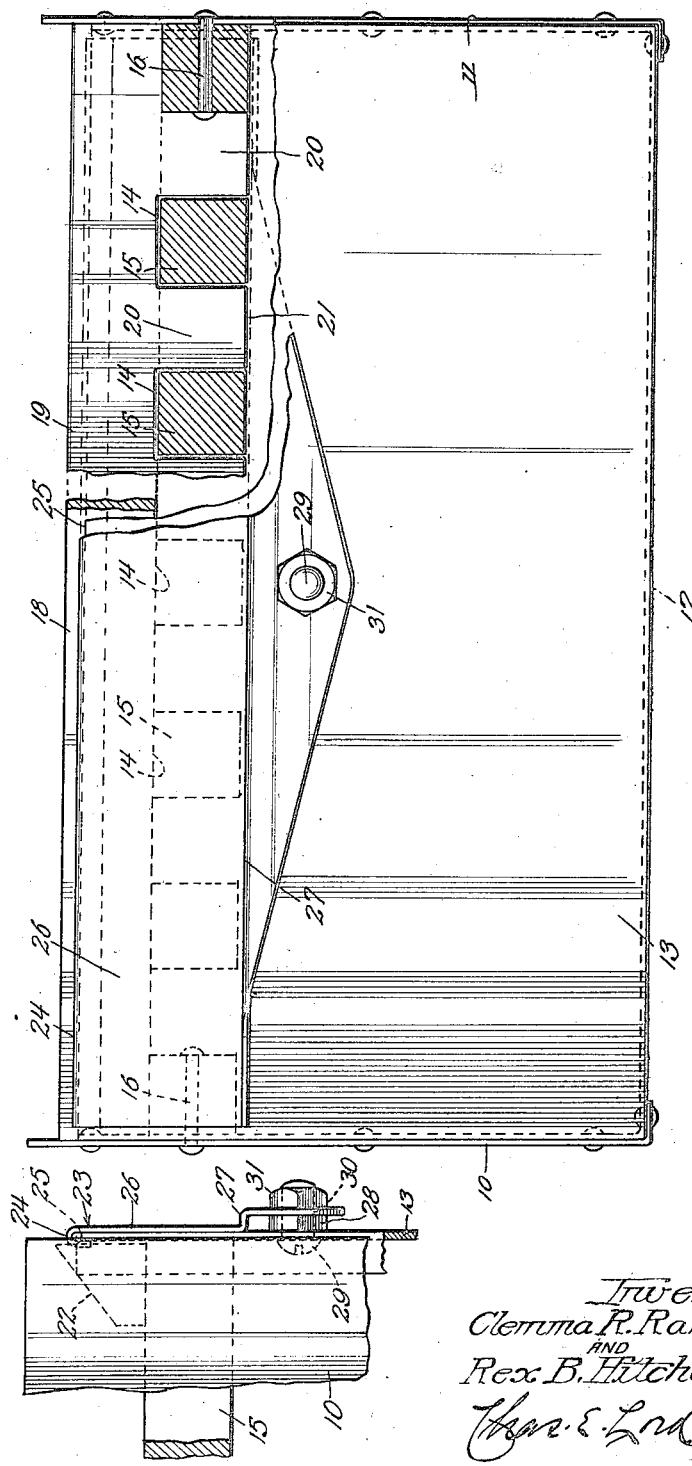
Inventors.
Clemma R. Raney.
AND
Rex B. Hitchcock.

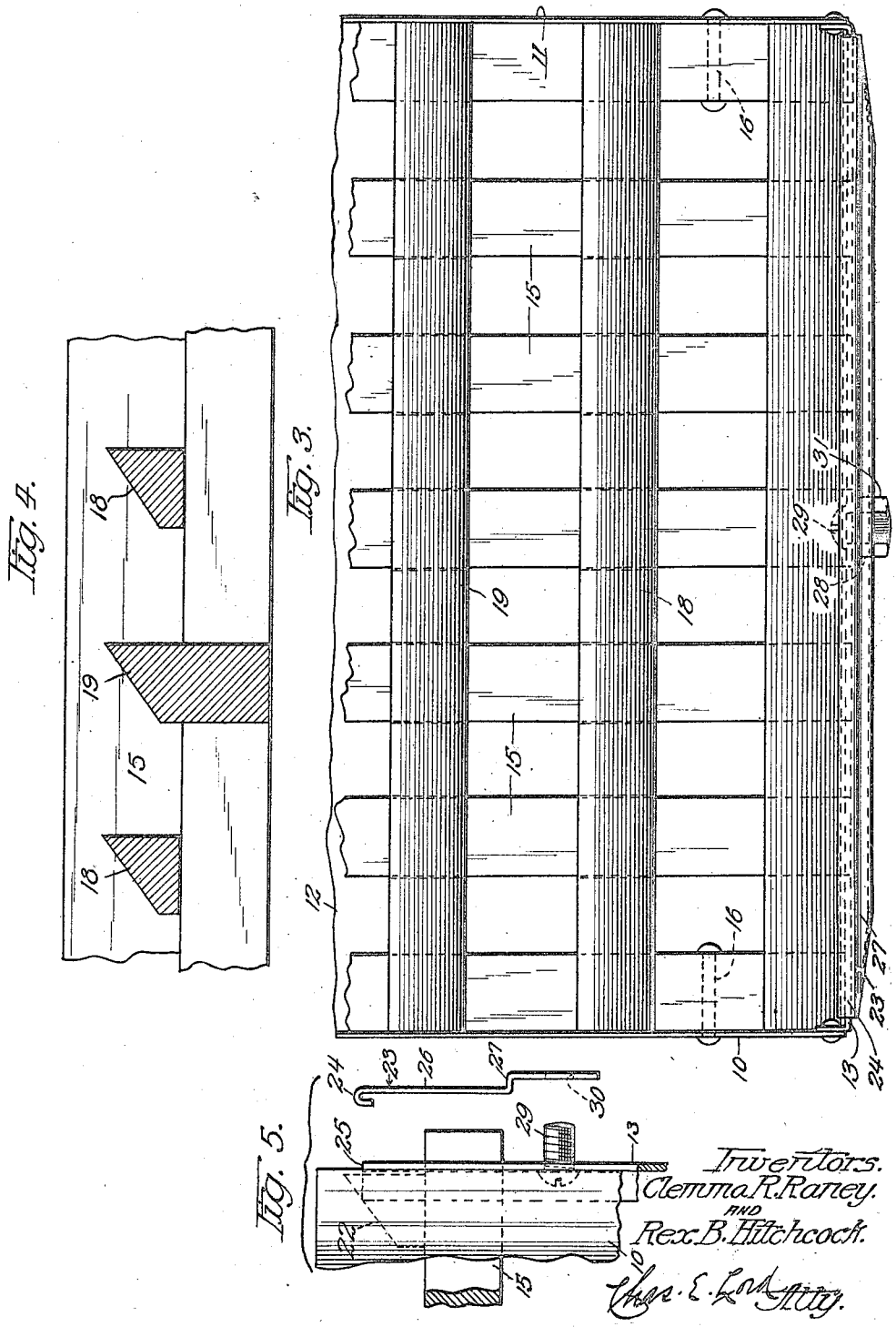

UNITED STATES PATENT OFFICE.

CLEMMA R. RANEY, OF CHICAGO, ILLINOIS, AND REX B. HITCHCOCK, OF HOOSICK FALLS, NEW YORK, ASSIGNORS TO INTERNATIONAL HARVESTER COMPANY, A CORPORATION OF NEW JERSEY.

ADJUSTABLE STRAW CONVEYER.

1,426,908. Specification of Letters Patent. Patented Aug. 22, 1922.

Application filed January 27, 1919. Serial No. 273,398.

*To all whom it may concern:*

Be it known that we, CLEMMA R. RANEY and REX B. HITCHCOCK, citizens of the United States, and residents, respectively, of Chicago, in the county of Cook and State of Illinois, and of Hoosick Falls, in the county of Rensselaer and State of New York, have invented certain new and useful Improvements in Adjustable Straw Conveyers, of which the following is a full, clear, and exact specification.

This invention relates to straw racks or straw walkers for threshing machines, and more particularly adapted for harvester threshers.

In operating harvester threshers in the field, varied conditions of grain are encountered; when the crops are heavy a considerable amount of straw is cut, and in poor seasons, with lighter crops, a smaller amount of straw is handled. It will be readily understood, therefore, that the straw racks or walkers which receive the straw from the threshing mechanism are called upon under these varied conditions to handle varying amounts of straw.

The present invention has for its object to provide a construction of straw walker or straw rack that may be adjusted to meet these varied conditions of operation, and a construction that will operate successfully whether the amount of straw being handled is large or small.

The object above outlined is accomplished by so constructing the straw walkers that the amount of opening through which the unthreshed grain falls, is made variable, or adjustable.

In the particular embodiment of the invention illustrated, the racks are provided with transverse and longitudinal slats, and the longitudinal slats are so arranged that certain of them can be removed thereby varying the amount of opening through which the unthreshed heads of the grain fall.

We have illustrated in the accompanying drawings one embodiment of our invention, and in these drawings,—

Figure 1 is a rear view, partly broken away, illustrating our improved construction of straw walker;

Fig. 2 is a side elevation, partly broken away, illustrating the construction of the retaining clip which retains the adjustable longitudinal slats in position in the walker;

Fig. 3 is a top plan view of the construction shown in Fig. 1;

Fig. 4 is a longitudinal sectional view on a smaller scale of a portion of one of the improved straw walkers; and Fig. 5 is a side elevation similar to Fig. 2 but showing the retaining clip detached and one of the longitudinal slats extending through the casing end wall.

In the construction illustrated in the drawing the straw walker is provided with the usual casing having side walls 10 and 11 and a bottom wall 12, these members preferably being formed of sheet metal. A rear wall 13 is secured to the side walls and bottom wall and is provided with a series of rectangular apertures 14 through which a series of longitudinal slats 15 are passed, the ends of these slats projecting through the apertures and resting on the lower edges of the apertures extending to a position flush with the outer surface of the wall 13, as illustrated in Figs. 2 and 3. The longitudinal slats 15 located immediately adjacent the side walls 10 and 11 are secured by any suitable means, such as rivets 16, to the side walls. A series of transverse slats 18 is secured in any suitable manner to the side walls 10 and 11 of the casing, and certain of these transverse slats, as, for instance, slat 19, shown in Fig. 4, are extended below the plane passing through the bottoms of the remaining slats, the portions thus projecting below the remaining slats extending between the longitudinal slats 15 as illustrated at 20 in Fig. 1, these projecting portions forming guides for the longitudinal slats 15. We have secured to the bottom surfaces of the projecting portions, transverse strips 21 preferably formed of sheet metal, these strips 21 forming a support for the slats 15. The upper surfaces of the transverse slats 18 are beveled as shown at 22, as is usual with this type of straw walker.

Suitable means has been provided for securing the removable slats 15 in position, this securing means being so constructed that it may be easily and quickly removed, thereby giving access to these slats and enabling the operator of the machine to withdraw or replace the slats at will. This securing means is illustrated in detail in Figs. 1 and 2, and as shown comprises a clip 23, preferably formed of sheet metal and having a bent over portion 24 at its upper end forming a hooked edge. This portion 24 is positioned over the upper edge 25 of the rear wall 13 and a body portion 26 of the clip extends vertically, covering the rectangular apertures 14 and preventing the removal or displacement of the longitudinal slats 15. The lower end of the clip is offset as shown at 27, the offset portion extending over a nut 28 which is threaded onto a bolt 29 secured by means of this nut to the rear wall 13 of the casing. The bolt 29 extends through the nut and through a suitable aperture 30 in the lower offset portion of the clip, and the clip is secured to this bolt by means of a nut 31.

From the above description it will be seen that we have provided a simple and efficient construction and a construction which is well adapted to the use for which it is intended. When the machine is operating in heavy grain it will be found expedient to remove certain of the longitudinal slats 15, and in order to do this it is necessary merely to loosen the nut 31, remove the clip 23 and withdraw as many of the longitudinal slats 15 as is necessary to allow the unthreshed heads to pass through the openings and back to the threshing mechanism or through the cleaning riddles. When the machine is operating in light grain it will be found expedient to use more of the longitudinal slats, thereby preventing too much of the straw from passing downwardly through the openings.

The extension of certain of the transverse slats 18 as shown at 19, in Fig. 4, provides suitable guides for the longitudinal slats, and the addition of the transverse strips 21 provides the necessary support for the slats 15.

While we have in the above specification described one embodiment which our invention may assume it should be understood that the invention is capable of modification, and that modifications may be made without departing from the spirit and scope of the invention as expressed in the following claims:

1. In a straw walker, a casing, a plurality of longitudinal slats slidably carried thereby, and means disposed across the outwardly extending ends of said slats for securing all of said slats against longitudinal movement.

2. In a straw walker, a casing having an end wall, said end wall having apertures therein, a plurality of longitudinal slats removably secured in said casing and disposed in alinement with the apertures of said end wall, and a clip for securing said longitudinal slats against removal.

3. In a straw walker, a casing having an end wall, a plurality of longitudinal slats removably carried thereby, and means including a clip having a hooked end adapted to extend over the end wall of said casing for securing said slats against removal.

4. In a straw walker, a casing, a plurality of cross slats secured to the side walls thereof, certain of said cross slats having downwardly extending portions, a plurality of longitudinal slats removably carried by said casing and extending between said downwardly extending portions of said cross slats, and means for supporting said longitudinal slats, said means being secured to said downwardly extending portion of said cross slats.

In testimony whereof we affix our signatures.

CLEMMA R. RANEY.
REX B. HITCHCOCK.